Aug. 19, 1952 W. D. YERRICK 2,607,564
CORROSION CONTROL IN TWO-PASS REGENERATIVE HEATER
Filed Oct. 8, 1949

INVENTOR.
William D. Yerrick
BY
ATTORNEY

Patented Aug. 19, 1952

2,607,564

UNITED STATES PATENT OFFICE 2,607,564

CORROSION CONTROL IN TWO-PASS REGENERATIVE HEATER

William D. Yerrick, Wellsville, N. Y., assignor to The Air Preheater Corporation, New York, N. Y.

Application October 8, 1949, Serial No. 120,340

1 Claim. (Cl. 257—6)

The present invention relates particularly to improvements in regenerative air heaters of the rotary type and specifically to minimizing corrosion of the heat transfer material.

Rotary regenerative heaters, such as those of the Ljungstrom type, comprise a rotor carrying heat transfer material which is first moved through a gas passage to absorb heat and then moves through an air passage to impart heat to the air which flows through the preheater in counterflow with respect to the heating medium. The gas and air ducts in such a preheater are in communication with apertures in sector plates at the opposite ends of the rotor and the latter is divided by radial partitions into a plurality of wedge-shaped compartments in which the heat transfer material in the form of plates is mounted. To prevent mingling of the streams of gas and air the partitions are conventionally provided with sealing members which bear against the opposing faces of the sector plates to seal the gas and air passages from each other.

The present invention contemplates dividing the rotor into inner and outer annular sections and providing special damper controlled ducts so that all of the heating gas at low loads may be directed over only part of the heat exchange material which, however, is adequate to heat the lesser volumes of air required. Another object is to provide a simple arrangement for tempering the stream of hot primary air at high loads.

One feature of the present invention is a heat exchanger construction in which the effects of corrosion on certain sections of the heat transfer plates due to cooling by the gases is minimized.

Other features and advantages of the present invention will become apparent upon consideration of the following detailed description of an illustrative embodiment thereof when read in conjunction with the accompanying drawing in which.

Figure 1:
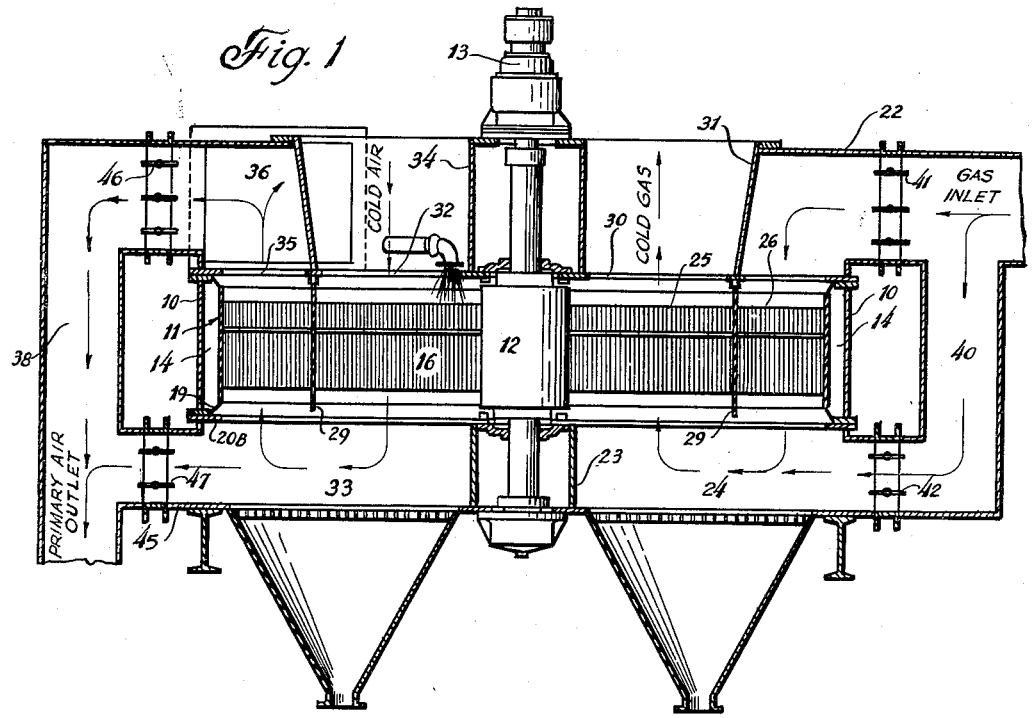
Figure 1 is a sectional elevation of a Ljungstrom type preheater embodying the present invention.

In the drawings the numeral 10 designates the preheater housing within which is mounted a rotor designated as a whole by the numeral 11 adapted to be slowly rotated within the housing on its axis 12 by a motor 13 operating through reduction gearing. Conventionally the rotor 11 consists of a cylindrical shell 14 connected by radial partition plates 15 to the rotor post 12. The radial partitions divide the interior of the rotor into wedge-shaped compartments each of which contains a multiplicity of spaced metallic plates 16 which absorb heat from hot gases passed thereover and then impart it to air or other fluid to be heated.

Figure 2:
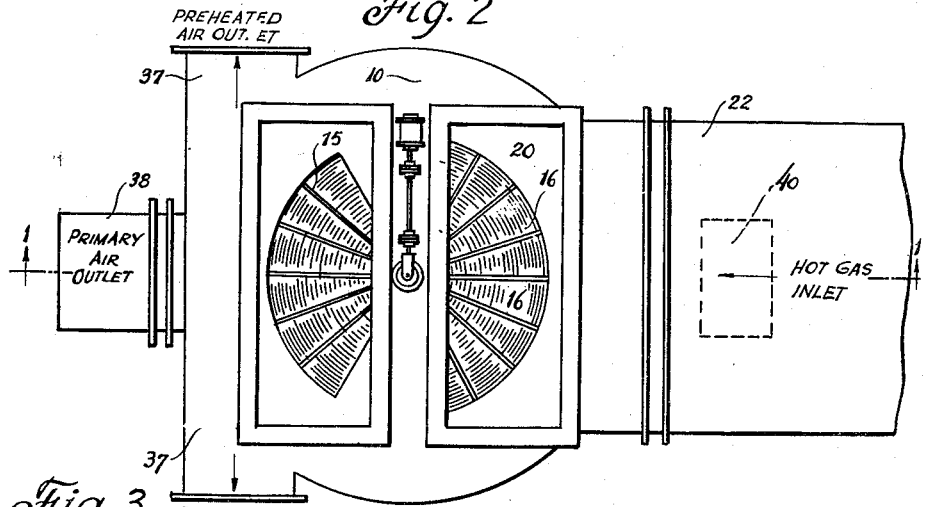
Figure 2 is a plan view corresponding to Figure 1.
Figure 3:
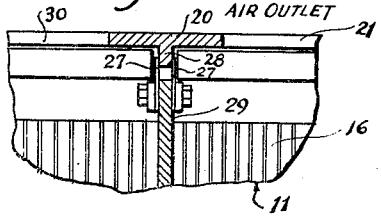
Figure 3 is a fragmentary view on an enlarged scale illustrating a sealing device.

Ordinarily the heating gases and the air to be heated flow countercurrent to each other at opposite sides of the axis 12 of the rotor, being admitted to and taken from the housing 10 through ducts connected into openings in the end plates 20 mounted on the housing 10 at opposite ends of the rotor as indicated in Figure 2. According to the present invention the rotor 11 is provided at a point inwardly of the shell 14 with a circular partition 29 which divides the rotor into inner and outer annular sections 25, 26 radially spaced from each other. Partition 29 is positioned at a radial location such that the flow area is substantially the same in the inner and outer sections, or somewhat greater in the latter to accommodate larger volumes of hot gas and heated air. On the upper end edge of this circular partition there are mounted circular sealing strips 27 which cooperate with a similar strip 28 (Figure 3) depending from the under side of the end or sector plate opposite the top end of the rotor. A special end plate 20 takes the place of the usual sector plate at the upper end of the rotor, being formed with an aperture 21 at the outer side of partition 29 and above section 26 of the rotor to provide for the admission at the upper end of the rotor of hot gases supplied through a duct 22 connected to the upper end of the housing 10. Beneath the rotor 11 an extension 23 of the housing 10 forms a chamber 24 so that gas flowing downwardly over the heat exchange plates 16 in the outer section 26 of the rotor may pass around the lower end of the circular partition 29 and reversing its direction flow upwardly over the heat exchange plates in the section 25 of the rotor to be discharged through an opening 30 in the end plate 20 into a gas outlet duct 31 suitably connected to the upper end of the housing inwardly of the gas inlet duct 22 and between the latter and the rotor post 12.

The air side of the heat exchanger is of generally similar construction, the cold air being admitted however to the inner section 25 of the rotor on the opposite side of the rotor post through an inlet duct 34. The air flows through sector opening 32 and downwardly through section 25 to reverse its direction in a chamber 33 on the opposite side of the rotor post 12 from the chamber 24 and then flows upwardly over the heat exchange plates in the outer section 26 of the rotor through sector opening 35 into a chamber 36 located on the top of the housing 10. In the arrangement shown the heated "secondary" air is taken from the chamber 36 through the dual outlet ducts 37 (Fig. 2) connecting into the ends of chamber 36 while primary air is diverted through a branch duct 38.

The sector plate 20B opposite the lower end of the rotor has only a pair of apertures, one each on the gas and air sides and separated by the usual imperforate portion against which the radial seals 19 bear.

A conduit 40 connects the gas inlet duct 22 directly with chamber 24 beneath the rotor and thereby forms a by-pass around the outer section 26 of the rotor on the gas.

At low loads of a boiler with which the apparatus is used the damper 41 is closed and the damper 42 opened so that a larger volume of gas may flow over the inner section 25, which is in effect the "cold end" section, and maintain the heat transfer plates 16 at a temperature above the dew point of the gases. This is further facilitated by provision of a duct 45 connecting the air side chamber 33 directly with the primary air outlet 38. Dampers 46 and 47 in ducts 38 and 45 are respectively closed and opened at low loads so that the outer section 26 of the rotor is not exposed to large volumes of relatively cool air at low loads.

The duct 45 performs the ancillary function of making it possible to mix quantities of relatively cool air from chamber 33 with the volume of primary air heated to high temperature at high loads so that tempering of the primary air stream may be effected.

An advantage of the invention is that the inner section 25 of the rotor containing the so-called cold end elements, i. e. those contacted by the coolest gases and the colder air and thus subjected to the greatest cooling action need not reach a temperature below the dew point of the gases where corrosion takes place because by diverting most or all of the hot gases to this section at low loads a safe temperature is maintained. Inasmuch as the depth of the surface in section 25 is reduced by about one half compared with that of the conventional heater, it is possible to obtain higher heat recovery from the gases at low loads without the risk of cooling the plates 16 in section 25 to a temperature below the dew point.

What I claim is:

In a regenerative air preheater having a housing containing a rotor turning about an axis centrally located therein, circular partition means dividing the rotor into inner and outer annular sections, heat transfer material carried in said sections, inlet and outlet ducts for a heating gas connected to said housing at one end thereof at one side of the rotor axis and communicating respectively with the inner and outer sections of said rotor, and means forming a chamber at the opposite end of said housing in communication with both the inner and outer sections of said rotor at said one side of its axis so that the heating gas may flow in series through said sections; a duct connecting said gas inlet duct with said chamber and forming a by-pass around said outer section; dampers in said gas inlet duct and in said by-pass adapted to apportion the flow of gas therethrough for maintaining the heat transfer material in said inner section at a temperature above the dew-point of said heating gas; inlet and outlet ducts for air connected to said housing at the opposite side of the rotor axis; means forming a second chamber interconnecting said inner and outer sections for series flow of air therethrough; means maintaining the streams of gas and air separated; a duct for primary air branched off said air outlet duct; a duct connecting said second chamber directly to said primary air outlet duct and forming a by-pass around said outer section of the rotor; and dampers in said air outlet duct and in said by-pass duct for apportioning the air flow through said rotor sections for maintaining the heat transfer material carried therein at a temperature above the dew-point of the heating gases.

WILLIAM D. YERRICK.

REFERENCES CITED

The following references are of record in the file of this patent:

UNITED STATES PATENTS

| Number | Name | Date |
|---|---|---|
| 1,781,303 | Rydmark | Nov. 11, 1930 |
| 2,480,277 | Yerrick | Aug. 30, 1949 |

FOREIGN PATENTS

| Number | Country | Date |
|---|---|---|
| 587,035 | Great Britain | Apr. 11, 1947 |